United States Patent
Dupre

[15] 3,655,436
[45] Apr. 11, 1972

[54] METHOD OF IMPARTING SOIL RELEASE PROPERTIES TO FABRICS

[72] Inventor: Jean Dupre, Levittown, Pa.
[22] Filed: Oct. 14, 1969
[21] Appl. No.: 866,367

[52] U.S. Cl. .............. 117/139.5 C, 117/138.8 F, 117/143 R, 117/165, 106/213, 260/233.3
[51] Int. Cl. ...................................................... D06m 15/04
[58] Field of Search ................. 117/139.5 C, 143 R, 165, 66, 117/138.8 F; 260/233.3 R

[56] References Cited

UNITED STATES PATENTS

| | | | |
|---|---|---|---|
| 2,946,705 | 7/1960 | Olsen | 117/143 X |
| 2,965,518 | 12/1960 | Meisel | 117/139.5 |
| 3,095,373 | 7/1963 | Blomfeld | 117/47 X |

*Primary Examiner*—William D. Martin
*Assistant Examiner*—Theodore G. Davis
*Attorney*—George W. F. Simmons, Carl A. Castellan and Arthur R. Eglington

[57] ABSTRACT

A method for treating materials to facilitate removal of soil therefrom is disclosed, involving contacting the soiled material with a nitrogen-bearing starch adduct having a pKa value from about 3 to 8. Novel compositions which impart soil release properties to materials without causing soil redeposition from the wash liquor are also taught, comprising the said starch adducts.

4 Claims, No Drawings

METHOD OF IMPARTING SOIL RELEASE PROPERTIES TO FABRICS

This invention relates to an improved soil release finish composition. In another aspect, it relates to providing starches modified chemically to make them cationic and, also to provide them with a dissociation constant having a prescribed range upon water dissolution. It further relates to a process for improving the cleaning of fabrics by use of cationic starches.

Starch, either raw or modified, has long been used in sizing textiles in various stages of their manufacture, as well as in sizing of garments in home and commercial launderies. Starch is also used in sizing paper, in clay coating of paper, in laminating, and corrugating adhesives, and the like.

In virtually all of the aforementioned applications, it is customary to use the starch in gelatinized (paste) form. A paste is prepared either by cooking raw or modified starch in water, or by dispersing a pregelatinized starch in cold or warm water. Then the material to be sized is dipped into, or passed through, or added to the paste, which operation leaves a film of starch paste on the material. Subsequent drying stiffens the film on the material.

Cellulosic materials, such as textiles, carry an anionic charge in aqueous solution. Natural starches in their unmodified state carry substantially no charge. Oxidized starches and many starch ethers are anionic in behavior.

Because of the charge relationships, a contact of cellulosic material in a solution of cooked paste, or suspension of starch could result only in a non-substantive wetting of fiber or fabric or physical entrapment of starch granules. The solution, or liquid passing through the material, remaining in the sizing vessel is essentially of the same constitution as that picked up by the cellulosic substance. The fiber, sheet or fabric, for example, would remove basically the same ratio of starch solids to water, as in the original starch to water composition, leaving a lesser amount of total liquid; but an unchanged water to starch composition.

There is a need for improved performance in laundering operations in the home and in commercial laundries. Difficulty in removing oily stains, and in removing body fats along with air-borne particulate matter from fabrics are problems particularly with polyester-containing fabrics and durable press resin-treated fabrics.

One method of improving soil removal during washing is the application of finishes to the fabric, which will act as soil release agents in subsequent washing operations. These finishes are generally polymeric materials applied to the fabrics in the textile mill.

Disadvantages of these finishes are that: 1) they are not permanent, and will gradually lose effectiveness during successive laundering; 2) they usually require relatively high levels of solids on fabrics; and 3) they interfere with other desirable fabric properties. Also of importance, they cannot be conveniently reapplied by the housewife or the launderer. The lack of convenience resides principally in the fact that these finishes are not substantive to the fabric. Thus, application requires padding on of a solution or dispersion; that is, relying on wet pickup, and evaporation of the water to deposit the finish. By this technique, a relatively high concentration of soil release agent must be present in the solution, and the solution that is not picked up by the fabric must either be saved for later reuse, which is awkward, or be discarded, which would ordinarily be prohibitively expensive.

It is known that the substantivity of starch to cellulosic materials, such as paper and cotton, is greatly enhanced by substituting cationically charged groups on the starch molecules. U.S. Pat. Nos. 2,813,093 and 2,876,217 describe methods for making cationic starch derivatives containing tertiary amino and quaternary ammonium groups, respectively. These starch derivatives are highly substantive to cotton fabrics.

However, although they are satisfactory as far as pick up and even distribution are concerned, they do become attached to the fabric; making the fabric cationically active. When the thus treated fabrics are washed, negatively charged soil particles are redeposited on the fabrics, leaving them in some instances, even more soiled than they were before washing. Another less serious objection is that some masking and flaking on the fabric occurs during ironing.

Thus, certain U.S. patents teach cationic starches for fabric treating, either as sizes or as stiffeners, where substantivity to fabrics is the basis of their use. U.S. Pat. Nos. 2,965,518 and 3,068,124 amply point out the basic deficiencies of the aforementioned cationic starches, that though they may exhaust onto the fabric, they will give it a positive charge.

The referenced imino disubstituted carbamate derivatives of the above '518 patent seeks to avoid this chronic problem by losing most of their positive charge upon ironing of a starch-treated fabric. This is a manifest handicap with the current trend toward no ironing, and/or wash-and-hang-dry types of textile goods. Indeed, ironing is impractical for the durable press treated polyester-cotton fabrics, which are among those most in need of a soil-release finish.

Three performance factors are necessary for a satisfactory process; 1) the soil release material must be appreciably substantive to a variety of fabrics from relatively dilute solutions upon a few minutes exposure, 2) the treated fabric should show significantly easier removal of various soils during the washing operations, and 3) no significant increase in soil redeposition on the treated fabric should occur during the washing.

More specific requirements would include 1) substantivity on polyester containing fabrics and fabrics with permanent press finishes, both of which present particularly severe cleaning problems, 2) release of body fats and airborne particulate soils as well as mineral oil based stains and food soils, and 3) effectiveness at low levels of soil release finish based on fabric weight to meet economic requirements and to avoid significantly affecting the feel and appearance of the laundered fabrics.

These performance properties can be achieved by my novel process which comprises 1) using a low level, less than 0.5 percent in water, of a cationic starch with weakly basic groups having a pKa in the range of 3–8 in a rinse bath with a pH about equal to (including up to 1 pH unit above the pKa) or below the pKa of the starch such that it is cationic (positively charged) and substantive to the fabric (negatively charged) 2) wearing or using the treated fabric with consequent soiling and 3) washing the treated fabric in an aqueous detergent bath with a pH above the pKa value, at least one pH unit above the pKa value.

It is a truism, then, that available cationic starches do not find acceptance, principally because of soil redeposition, under household laundering conditions.

I have discovered the rationale for the consistent failure of prior art cationic starches as treating agents for household fabrics. It lies in the lack of past comprehension of the criticality of the relationship of the dissociation constant and the ionic charge of chemically modified starches, upon water dissolution or dispersion; i.e., that range needed to prevent soil redeposition. Even in materials where the redeposition problem was minimized, such as by using a heat unstable cationic group on the starch, the purpose was then merely for stiffening the fabric, with no awareness of trying to achieve soil release properties.

According to the present invention, we achieve the long-sought objects by a judicious selection of cationic starches having dissociation constants within carefully defined limits, coupled with controlling the pH of the starch application bath and wash bath.

Broadly, a cationic starch is provided with a pKa ranging from about 3 to about 8, and the starch is exhausted onto the fabric from the application bath at a pH about or below that same pKa value.

My invention is basically a means of economically improving the washability of fabrics and involves applying a soil release finish under certain conditions and subsequently washing the treated fabric after soiling under certain conditions.

These sequential steps can all be carried out in standard household washing machines. My invention resides in discovering the very specific process necessary to achieve useful results.

It is an object of this invention to provide a superior soil release fabric finish based upon novel cationic starch compositions which may be economically applied by exhaustion from a dilute application bath.

It is another object to provide a finish-treated fabric whereby upon washing, the cationic nature of the starch is eliminated.

Another object of the invention is to provide a soil-release agent which is highly substantive to fabrics, like durable-press resin treated polyester cotton blends, and which may be applied during the final rinse of a laundering operation.

It is another object to provide a low-cost soil release finish which will not preclude absorption of perspiration from the skin.

These and other objects will become even more apparent upon study of the following detailed specification:

It is essential in the present invention, that the here disclosed containing compounds or compositions be substantive, and capable of being used in dilute aqueous solutions. Dilute solutions of substantive compounds, or compositions, permit appreciable exhaustion of the compound, or composition from the bath onto the household textile article. This leaves a bath which contains such a reduced level of the treating composition so that it may be economically discarded.

In addition, the treating compounds or compositions must be adaptable so that the treated fabric can withstand drying under varying conditions, and other subsequent operations.

The treating compounds or compositions must also be capable of being used on a wide variety of household textile articles made from diverse natural and man-made fibers, and blends thereof, which may have been subjected to various chemical treatments.

The detergent composition which may be employed in the method of the present invention could be any water soluble or dispersible composition that contributes to soil removal. The commonly employed household laundry products are comprised principally of alkaline builders and surface active agents with minor amounts of additives. The alkaline builders usually are polyphosphates, such as sodium tripolyphosphate, tetrapotassium pyrophosphate and sodium or potassium silicates. The surface active agents are chosen from the class of anionics, such as alkyl benzene sulfonates, alkyl sulfates, alkoxy polyethoxy sulfates or soaps; and the class of nonionics, such as ethyoxylates of alkyl phenols and long chain alcohols or alkanolamides of fatty acids. Additives commonly included are anti-soil redeposition agents (for example, sodium carboxymethyl cellulose), optical brighteners, perfumes, and dyes. Bactericides or bacteriostats are sometimes added. Sodium sulfate, borax, sodium hydroxide and sodium orthophosphates are also commonly encountered. Part or all of the polyphosphate builder may be replaced with other sequestering and/or dispersing agents, such as sodium nitrilotriacetate, tetrasodium ethylene diamine tetracetic acid or an aminophosphonic acid salt.

The choice of detergent composition is not a crucial aspect in regard to my method of cleaning. Improvement in soil removal can be achieved with pretreating the fabric with the cationic starch, and washing with a variety of detergents. The necessary requirement is the presence of sufficient alkaline builder, in the wash bath, to give a pH above the pKa of the particular cationic starch. For example, when the starch pKa is about 6 to 7, then the desired pH of the wash bath is above 8, preferably in the range of 8.5 to 10.5.

By pretreating the fabrics with the soil release agent, it is possible to use detergents of lesser effectiveness than the currently employed heavy duty household products, and still achieve adequate performance. For example, polyphosphate free detergents can, in some cases, be employed which will avoid the nutrient effect of detergents on algae, which impairs the quality of water in lakes and streams.

I postulate that any derivative of starch containing an ionizable nitrogen-bearing group, with a pKa in the range of 3 to 8 is within the broad teaching of this invention.

Among the modified starches which meet the above prescribed criteria are the following classes of compositions:

1. 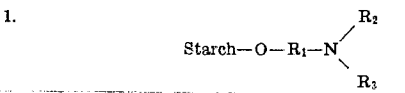

in which $R_1$ is an alkylene or hydroxyalkylene of 1 to 6 carbons, alkenylene of 2 to 6 carbons, alkyleneoxy of 2 to 4 carbons, or polyalkyleneoxy having 2 to 4 carbons per monomer unit, and from 2 to 20 units per substituent, and $R_2$ and $R_3$ taken individually are:

a. (1.) alkyl, straight or branched, hydroxyalkyl, thioalkyl, or alkoxyalkyl all of 1 to 6 carbons, or alkenyl of 2 to 6 carbons; or (2.) cycloalkyl from three to six carbons; aryl, like phenyl or naphthyl; arylalkyl from 7 to 10 carbons, like benzyl or phenethyl; or alkyl aryl, from seven to ten carbons, like tolyl; or b. $R_1$ and $R_2$ or $R_2$ and $R_3$ taken collectively with the nitrogen atom to which they are joined, to form a heterocyclic saturated or unsaturated five or six membered ring, like morpholino and picolyl; and c. at least one of the R groups contains either an electron withdrawing group attached to the carbon atom, beta to the nitrogen, like oxygen or hydroxyl or a group that sterically hinders protonation of the nitrogen atom.

2. Starch-O-$R_4$-X, wherein X comprises more than one ionizable nitrogen atom, contained in one or more heterocyclic rings, such as imidazol and $R_4$ is alkylene or hydroxyalkylene of 1 to 6 carbon atoms, alkyleneoxy having 2 to 4 carbons, or carbonyl; and where the resultant starch adduct has an apparent pKa of 3 to 8.

3. A starch onto which a polymeric group, containing repeating ionizable nitrogen atoms, has been grafted, through a carbon, oxygen, nitrogen, or sulfur atom, such as a polyvinyl imidazol, or polymorpholinoethylmethacrylate, or other ethylenically unsaturated acid derivatives.

4. 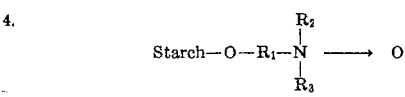

where $R_1$ is an alkylene or hydroxyalkylene of one to six carbons alkenylene of two to six carbons alkyleneoxy of 2 to 4 carbons, or polyalkyleneoxy having 2 to 4 carbons per monomer unit, and from 2 to 20 units per substituent;

and $R_2$ and $R_3$ taken individually are as defined in (a) (1) and (2) above, or, $R_1$ and $R_2$, and $R_2$ and $R_3$, are as defined in (b) above. In each instance, the substituted starch has an apparent pKa in the range of 3 to 8.

Also, comprehended by this invention are substituted cationic starches containing more than one type of ionizable nitrogen-bearing group on the same starch molecule, as well as mixtures of different classes of the above described substituted starches.

The term "starch" includes unmodified starches from a variety of sources such as cereals and tubers, as well as modified starches. Modified starches are those that have been either hydrolyzed, oxidized, dextrinized, or those that have been etherified or esterified with non-cationic substitutents.

In our definition of cationic starches with pKa values of 3 to 8, we wish to include not only starches with covalently bonded cationic substituents (ethers for example), but also cationic starch complexes such as those described in U.S. Pat. No. 3,320,118. Specifically, we wish to include fatty alkyl amine-gelatinized starch complexes, which can be shown to have pKa values in the 3 to 8 range, whereby the cationic starch is a result of an association of gelatinized starch and the fatty alkyl amine. These can be prepared readily by mixing in aqueous solution a gelatinized starch and the fatty alkyl amine.

In the cases where potato starch, an oxidized starch, or some etherified or esterified starches are employed, some anionic phosphate or carboxyl groups will be present. Upon starch attachment of the ionizable nitrogen-bearing group, these starch adducts will now have an amphoteric nature; that is, the charge on the starch molecule in acidic solutions will be predominantly cationic (positive), due to ionization of the nitrogen group; and will be predominantly anionic (negative) in alkaline solutions due to ionization of the anionic group.

Polysaccharides other than starch can be employed as starting materials in this invention. Suitable examples would be cellulose, natural plant hydrocolloids such as gum arabic or guar gum and seaweed hydrocolloids such as alginates.

The pKa of a cationic starch is a means of describing the relationship of its degree of ionization, and the pH of the solution. The cationic starches of interest are weak bases, where the ionizable substitutents can exist in the protonated (positively charged) form, or in the non-protonated nonionic form, depending on the concentration of hydrogen ion present, which of course, is expressed by pH.

For monomeric basis, $$pKa = -\log Ka = \frac{[B][H+]}{[BH+]}$$

assuming an activity coefficient of unity. For the polyelectrolyte cationic starches, we have defined pKa as equal numerically to the pH at the point of 50 percent ionization. Thus at a pH above the pKa, the starch is less than 50 percent cationic and at pH's below the pKa, it is greater than 50 percent cationic. The pKa can be calculated from pH titration curves taken of the cationic starch with strong acids and bases.

Percent exhaustion of the test material is a measure of the percent of the material in solution that is removed from solution by adsorption onto the test fabric. It is determined by measuring the concentration of material before and after contact with the fabric by means of a photometric measurement of color of an iodine-starch complex formed by adding an iodine-iodide solution to the test starch solutions.

The term "soil release" is defined as the improvement in removal of soil components in the washing operation.

"Soil redeposition" refers to pick up of soil components by the test fabric during the washing operation, these soil components being present in the wash bath by virtue of being removed from fabrics. Soil release is evaluated by soiling the test fabric with used motor oil (a mixture of 2 parts refined mineral oil and 1 part of crankcase oil), washing in a Tergotometer with a household laundry detergent product and measuring the change in reflectance of the soiled fabric.

Soil release is expressed as percent detergency which is calculated as:

$$\frac{\text{Washed reflectance} - \text{soiled reflectance}}{\text{Initial reflectance} - \text{soiled reflectance}} \times 100 = \text{percent detergency}$$

Soil redeposition is measured by washing unsoiled test fabrics in a wash solution of a home laundry detergent product with a soiled ballast load. The ballast fabrics are soiled by padding on a dispersion of synthetic sebum and airborne particulate soil, as described by Spangler et al., JAOCS, vol. 42, No. 8 pp. 723 to 727, 1965. The loss of reflectance of the test fabrics indicates redeposition. In both tests, conditions encountered in home laundering were used. Home laundry detergents used for general laundering in washing machines, so called heavy duty products, generally produce a pH of about 9–10 initially, at use concentrations of 0.1–0.2 percent product in water. With soil present, the pH of the wash water may drop to 8.5–9.0.

Degree of substitution (D.S.) is a measure of the number of hydroxyl groups on each anhydroglucose unit of the starch molecule that have been reacted with the cationic reagent. Each unit has 3.0 hydroxy groups; and thus, a D.S. of 3.0 would represent complete substitution.

Illustrative of reactants which will combine with starch to form a cationic starch of the herein defined requisite properties are the following:

N-(2-Chloroethyl)-morpholine
N-(2-Chloropropyl)-morpholine
N-(2-Chloroisobutyl)-morpholine
N-(2-Chloropentyl)-morpholine
N-(2-Bromohexyl)-morpholine
N,N-Diisopropyl-2,3-epoxypropylamine
N-Ethyl-N-2-hydroxyethyl-2,3-epoxypropylamine
N-Methyl-N-2-Hydroxyethyl-2,3-epoxypentylamine
N,N-Diisoamyl-2,3-epoxypentylamine
N-Hexyl-N-2-Hydroxyethyl-2,3-epoxybutylamine
N,N-Diisoheptyl-2,3-epoxybutylamine
N-Pehnyl-N-Ethyl-2,3-epoxypropylamine
N-Methyl-N-Napthyl-2,3-epoxypropylamine
N-Propyl-N-(2-hydroxyethyl-)-2,3-epoxybutylamine
N,N-Diisopropyl-2,3-epoxypentylamine
N,N-bis-2-Hydroxypropyl-2,3-epoxypropylamine
N,N-bis-2-Hydroxybutyl-2,3-epoxyhexylamine
N,N-bis-2-Hydroxyisopropyl-2,3-epoxybutylamine
N,N-bis-2-Hydroxyisoamyl-2,3-epoxypentylamine
N-(2,3-Epoxypropyl)-morpholine
N-(2,3-Epoxyhexyl)-morpholine
N-(2,3-Epoxybutyl)-morpholine
N-(2,3-Epoxyisoamyl)-morpholine
N-(2-Chloroethyl)-N-ethylaniline
N-(2-Bromoethyl)-N-butylaniline
N-(2-Chloropropyl)N-isopropylaniline
N-(2-Chlorobutyl)-N-pentylaniline
N-(2-Chloroethyl)-morpholine-N-oxide
N-(2-Chloroethyl)-N,N-diethylamine-N-oxide
N-(2,3-Epoxypropyl)-morpholine-N-oxide
N-(2-Chloroethyl) N-benzyl-N-methyl amine
N-(2-Chloroethyl) N-benzyl N-(2-methoxyethyl) amine
3-Picoyl chloride
4-Picolyl chloride The amine oxide containing cationic starches can be prepared by two general methods. Reactive reagents such as those included in the previous list can directly introduce the amine oxide functionality. Alternatively, a tertiary amine reagent can be used to form a cationic starch and the adduct subjected to oxidation to convert the amine to the amine oxide. With this latter method, the tertiary amine substituted starch intermediate can have a pKa above 8 as oxidation to the amine oxide will yield a pKa in the 3 to 8 range.

Typical of the starch adducts which were produced having pKa values and adequate degrees of substitution are those enumerated in the tabulation below:

| Substituent on Starch (—S) | pKa | D.S. |
|---|---|---|
| 2(N-benzyl N-methyl amino) ethyl-S | 7.1 | 0.03 |
| 2(N-benzyl N-methoxy ethyl amino)ethyl-S | 6.7 | 0.03 |
| 3 picolyl-S | 3.5 | 0.02 |
| 2(N-ethyl N-phenyl)ethyl-S | 4.5 | 0.009 |
| 3(bis-2-hydroxypropyl) amino-2-hydroxypropyl-S | 6.7 | 0.03 |

The soil release agent is exhausted from a dilute aqueous solution, which would generally be the final rinse bath of a conventional laundering operation. The treating bath would contain the substantive cationic starch with a pKa value in the range of 3 to 8 and an agent capable of producing a pH at or below the pKa value. The concentration of substantive cationic starch in the treating bath would generally be in the range of 0.01 to 0.2 percent based on the water which, upon exhaustion and subsequent drying, would give a range of 0.07 to 2 percent finish solids based on fabric weight. The specific concentrations employed will vary with the bath to fabric ratio, the number of prior exhaustion-wash cycles the fabric has been subjected to as well as to cost considerations.

Generally, however, concentrations above 0.5 percent in the rinse bath would be wasteful as exhaustion efficiency decreases with increasing ratio of cationic starch to fabric and soil release tends to level off at higher add-on levels. There is no precise lower limit to useful concentration as any amount contributes some soil release, low fabric to bath ratios can compensate for low concentrations of cationic starch in the bath and multiple exhaustion-wash cycles will allow some build up. The choice of agent for controlling pH will depend on the desired pH which is determined by the pKa of the particular cationic starch. The required concentration of agent will depend on the alkalinity of the rinse water and the amount of alkalinity adsorbed or held by the fabric that has just been subjected to an alkaline wash. Any of the well known buffering systems that will produce a pH in the 3 to 8 range can be used. Buffers are comprised of a weak acid and its conjugate base. With cationic starches with pKa values around the preferred range of 5 to 7, the acetic acid-sodium acetate, or citric acid-sodium citrate systems are effective in maintaining the pH of the rinse bath at the desired level.

Several cationic derivatives of corn starch of varying pKa values are listed in Table I below, along with exhaustion, soil release and soil redeposition. These derivatives consist of four exemplary compositions with a pKa in the claimed range, and two cationic starches that do not have pKa values within the 3 to 8 range.

In these tests, polyester cotton 65/35 fabrics, with permanent press finish, were contacted in a rinse bath with a dilute solution of the cationic starch, followed by spin extraction to remove excess moisture and drying in an oven at 70°C for 20 minutes. The treated fabrics are then evaluated for soil release and soil redeposition. The cationic starches, normally obtained as granular products are gelatinized, by heating to form a colloidal solution, prior to exhaustion. The data demonstrate that all the cationic starches tested are substantive (defined here as at least to 45percent under the test conditions) and gave significant soil release activity.

TABLE I.—PERFORMANCE OF EXEMPLARY CATIONIC STARCHES [1]

| Substitutent on starch [2] | pKa | Percent exhaustion [3] | Soil release [4] | Redeposition [5] |
|---|---|---|---|---|
| None (starch alone) | | 0 | | |
| 3-(trimethyl ammonium)2-hydroxy propyl | ([6]) | 45 | | 12 |
| Diethyl amino ethyl | 8.4 | 47 | + 76 | 8 |
| 3-(N-phenyl-N-ethyl amino) 2-hydroxy propyl | 7.8 | 57 | | 4 |
| N,N-bis-Isopropylamino 2-hydroxy propyl | 6.9 | 71 | 65 | 3 |
| Morpholinoethyl | 6.2 | 66 | 67 | 2 |
| Control (no starch on fabric) | | | 36 | 2 |

1. On 65/35 polyester-cotton with permanent press finish, shirting weight, prewashed to remove some of mill applied additives (softeners, unreacted resins, etc.)
2. Corn starch, all adducts are in range of approximately 0.03–0.04 degree of substitution, all groups replacing hydrogen on some of the OH groups on starch.
3. .05% cationic starch in water, pH adjusted to 4.6 with Na acetate, bath to fabric ratio 15/1, 45°C, 2 minutes contact time.
4. 49° C, 0.15% Coldpower*(*Colgate-Palmolive Company, Jersey City) detergent, 50 ppm hardness, 10 minute wash at 100 rpm, 2 minute rinse, reflectance measured with green tristimulus filter on Photovolt reflectometer.
5. 49° C, 0.10% Coldpower detergent, 14 pieces of soiled 3 × 3 inch fabrics, 2 unsoiled white 3 × 3 inch fabrics, 250 ml of solution with 50 p.p.m. hardness, 15 minute wash, 2 minute rinse. Reflectance measured as in footnote (4) above.
6. Strong base, ionized over entire pH scale, equivalent to having a pKa of greater than 14.

The two adducts above that do not have pKa values which are in the 3 to 8 range, however, cause excessive redeposition of soil on the fabrics treated with cationic starch as indicated by a loss of 8 to 12 reflectance units, or 6 to 10 units greater loss of whiteness than the untreated fabric. The adducts with pKa values below 8 cause little or no soil deposition on treated fabrics, 0 to 2 units greater loss than the untreated control fabrics.

It can be concluded that starches which are present on the fabric in the pH 8.5 to 10.0 wash water encountered in home laundering in the cationic positively charged state, will cause redeposition of particulate soil and loss of whiteness. This result is in agreement with general conclusions found in the prior art.

Those cationic starches that are currently on the market are predominantly the diethylamino ethyl adduct and quaternary ammonium adducts which are cationic at least to a significant extent in household laundering operations. Thus, statements that cationic starches do not find use on fabrics that will be subject to washing because of soil redepositions, is true with respect to the currently marketed cationic starches.

It is unexpected that certain cationic starches would have no significant deleterious effect of soil redeposition. The surprising result that cationic starches with pKa values below 8 do not cause soil redeposition is explainable on the basis that they are not cationic in the pH 8.5 to 10.0 of the home laundry bath; thus, in this non-cationic state, they will avoid redeposition.

The results in Table II demonstrate that a morpholinoethyl substituted starch, a preferred composition, is especially effective with various fabrics based on cotton, polyester, nylon and on a fabric with a permanent press finish. Exhaustion at a pH below its pKa and soil release at a pH above its pKa are shown with these fabrics.

TABLE II.—PERFORMANCE OF MORPHOLINOETHYL STARCH ON CERTAIN FABRICS

| Fabric | Percent exhaustion [1] | Percent added on | Percent detergency [2] | Percent [2] detergency without finish |
|---|---|---|---|---|
| Polyester-cotton 65/35 | 42 | .32 | 55 | 28 |
| Polyester-cotton 65/35 with permanent press | 66 | .50 | 67 | 34 |
| Polyester | 29 | .22 | 43 | 19 |
| Nylon | 53 | .40 | 76 | 49 |
| Cotton | 69 | .52 | 60 | 46 |

[1] .05% morpholionethyl starch, 10 minutes, pH 4.6, 45° C.
[2] Same conditions as Table I.

These data, along with those in Table I, illustrate an additional unexpected aspect of my invention. The appreciable improvement in ease of soil removal produced by the cationic starches at such low levels is surprising. As little as 0.3 percent cationic starch based on the weight of fabric (dry weights) markedly improves detergency. Unmodified starch commonly applied by wet pick up, or spraying on fabrics to impart stiffening or bodying, produces essentially no soil release effect at a level of 0.3 percent; I obtained 38 percent detergency for an unmodified corn starch applied to fabric (by spraying and drying) and washed under conditions used in Table I.

The data in Table III illustrates several important points. First, unmodified starch is not substantive to fabric. Morpholinoethyl ethers of various starches are substantive, and give soil release, using corn starch with amylose-amylopectin ratio of about 25/75, or potato starch with a similar composition, but with higher molecular weight and a high amylose content starch (75/25 ratio).

Degree of substitution is not a crucial aspect of cationic starch in the rinse bath. Generally, a low degree of substitution is desirable, for example, in the range of 0.01 to 0.1. At low levels of cationic starch in the rinse water, such as 0.01%, soil release can be improved by subjecting a fabric to several exhaustions and washings, prior to measuring soil release, a not uncommon situation, as an oily stain is obviously not encountered during every wearing.

TABLE III.—SUBSTANTIVITY OF MORPHOLINOETHYL ETHERS OF STARCHES

| Starch [1] Source | Degree of substitution | Exhaustion Bath [2] | | Percent add on | Percent detergency [2] wash bath |
|---|---|---|---|---|---|
| | | Concentration | Percent exhaustion | | |
| Corn | .038 | .05 | 66 | .50 | 67 |
| Potato | .035 | .05 | 42 | .32 | 71 |
| Amylose [3] | .037 | .05 | 74 | .52 | 62 |
| Corn | .034 | .05 | 42 | .31 | 73 |
| Do | .082 | .05 | 30 | .23 | 74 |
| Do | .038 | .01 | 84 | .13 | 45 |
| Do | .038 | .03 | 50 | .22 | 63 |
| Do | .038 | 0.10 | 23 | .34 | 75 |
| Do | .038 | 0.20 | 12 | .36 | 78 |
| Corn, oxidized [4] | .011 | 0.05 | 44 | .34 | 60 |
| | .039 | 0.05 | 46 | .35 | 70 |
| | .084 | 0.02 | 43 | .13 | 62 |
| No substituent (corn) | 0.0 | .05 | 0 | | |
| Control (no finish on fabric) | | | | | 34 |

[1] All these adducts had pKa values in the range of about 5.8–6.6.
[2] Same conditions as Table I.
[3] "Amylon 7," a high amylose content starch, sold by National Starch and Chemical Corporation.
[4] Stayco S, manufactured by A. E. Staley Co., Decatur, Illinois.

Table IV reveals the effect of pH on exhaustion of the morpholinoethyl starch. With its pKa of 6.2, the percent exhaustion will noticeably decrease as the pH of the rinse bath rises above about 7.2; that is, at a pH approximately one unit above the pKa, the cationic starch no longer has sufficient positive charge to be highly substantive.

The data here also demonstrates that a longer time (10 minutes) will allow somewhat greater exhaustion, but that considerable exhaustion will be obtained within the 2 minute time limit, normally encountered in the final rinse cycle of home clothes washing machines.

TABLE IV

RELATION OF DEGREE OF EXHAUSTION VS. pH

FOR MORPHOLINOETHYL DERIVATIVE CORN

STARCH (0.028 D.S.)

| pH[1] | 2 Minutes | | 10 Minutes |
|---|---|---|---|
| | % exhaustion | % detergency | % exhaustion |
| 2.3 | | | 51 |
| 3.6 | | | 61 |
| 4.7 | 41 | 67 | 50 |
| 6.2 | 54 | 64 | 67 |
| 7.2 | 44 | 63 | |
| 7.6 | | | 25 |
| 9.0 | | | 10 |

(1) adjusted pH of exhaustion bath, 0.05% adduct.

For best results, the cationic starches must be gelatinized prior to addition to the rinse water of the washing machine. A liquid product would be a convenient form for a housewife to use, but this would require a relatively concentrated solution to avoid the necessity of having to use large quantities for each addition. Cationic derivatives of unmodified starches are too viscous in gelatinized form at concentrations much above a few percent.

The examples in Table V illustrate preferred treatments where the cationic starch is subjected to acid modification to reduce the viscosity of concentrated gelatinized solutions, without sacrificing substantivity or soil release. The 15 percent gelatinized solution, obtained after the 0.7M $H_2SO_4$ 22 hour treatment, pours easily and disperses readily in the rinse water. Anti retrogradation agents and liquifying agents of conventional types which do not interfere with exhaustion, soil release, or soil redeposition, can be used.

TABLE V

PERFORMANCE OF

ACID MODIFIED MORPHOLINOETHYL STARCH[1]

| Acid Treatment[2] | 15%[3] Viscosity | %[4] Exhaustion | %[4] Detergency |
|---|---|---|---|
| none | gel | 32 | 64 |
| 0.3 Molar HCl 7 hrs | 200 | 41 | 77 |
| 0.7 $H_2SO_4$, 22 hrs | 50 | 36 | 62 |

[1] 0.038 D.S., morpholinoethyl corn starch

[2] granular form stirred in water at 50° C., filtered, washed, and dried.

[3] viscosity of gelatinized starch, in centipoise at 25° C.

[4] same conditions as Table I.

The soil release and lack of deleterious effect on soil redeposition by treatment of fabric with the morpholinoethyl starch is illustrated further in the tests summarized in Table V. These tests are multicycle tests designed to evaluate the removal of body fats and air borne particulate soil, generally considered to be the major soiling problems encountered in home laundering, and the principal causes of yellowing and greying of garments after repeated wear and wash cycles. The natural soil test is described by J.R. Trowbridge and J. Rubenfeld, Chemistry, Physics and Application of Surface Active Substances, Volume III, C. Paquot ed., Gordon and Breach Science Publishers, London 1967.

It involves wiping test cloths on the face and neck of panelists followed by washing. Per data in Table VI, polyester cottons 65/35 with permanent press, was subjected to 6 cycles of soiling and washing with a household laundry detergent. One set of fabrics was contacted with 0.10 percent solution of gelatinized morpholinoethyl starch in the second rinse following each wash, while a second set was rinsed in water alone. Reflectance is measured using a green tristimulus filter to indicate loss of whiteness with respect to greying; and by using a blue tristimulus filter to indicate yellowing. A similar series was run, using a soiling technique according to Spangler, as described previously.

TABLE VI

Loss of Whiteness

| Detergency Test | Without cationic starch | | With cationic starch | |
|---|---|---|---|---|
| | greying | yellowing | grey. | yellow |
| Natural Soil 6 cycles | | | | |
| soiled fabrics | 6.7 | 4.8 | 2.7 | 1.0 |
| unsoiled fabrics | 1.5 | (+0.4) | 0.1 | (+1.6) |
| Synthetic Sebum-Airborne Soil 3 cycles | | | | |
| soiled fabrics | 20 | 19 | 10 | 9.2 |
| unsoiled fabrics | 0.4 | 0.6 | 0.7 | 1.6 |

(1) morpholinoethyl starch, 0.10% in exhaustion bath.

The data show that the treatment with the cationic starch significantly reduces the loss of whiteness with respect to greying and yellowing of the soiled fabrics, even after multiple soiling and washing cycles. In addition, it can be seen that treatment of the fabric with a cationic starch of pKa 6.2 does not significantly affect redeposition of soil onto unsoiled test pieces washed in the same wash bath.

The eventual fate of materials used in washing processes is of concern with respect to water pollution. Five day BOD*(*Biological Oxygen Demand) tests on a low D.S. (0.038) diethylaminoethyl starch, indicate that it is readily degraded by bacteria, showing a BOD 65 percent of its chemical oxygen demand, and 81% of the BOD of the known highly biodegradable unmodified corn starch. Thus, these low D.S. cationic starches will be quickly degraded by normal sewage disposal, or by the bacteria present in lakes, rivers, and ground waters, and should not contribute to lowering of water quality.

The data presented herein demonstrates that soil release can be obtained, according to the teachings of this invention, with cationic starches in alkaline wash baths at ph's above their pKa, that appreciable exhaustion will take place in solutions with a pH below the pKa, and up to about one unit above the pKa, and that soil redeposition can be substantially avoided by using cationic starches with pKa values below the pH of the detergent bath.

Thus, the upper limit of a suitable pKa is about 8, in order for it to be suitable in the pH 8.5 to 10.0 solutions found in the wash cycles, when using the common heavy duty household laundry detergents. The lower limit of suitable pKa is determined by the pH that is practical to employ in the rinse cycle of the washing machine. Since solutions with pH's below 3 to 4 would tend to be excessively corrosive to household washers and would also present a hazard with respect to handling by the housewife, a pKa value of about 3 appears to be the lower limit of utility.

In addition to soil release, the treatment of the fabric with the cationic starch might offer other advantages such as antistatic activity, improved ability to absorb water, increased strength, etc.

Certain of the exemplary cationic starches disclosed here, can be prepared by known techniques, such as those described in U.S. Pat. No. 2,813,093. To be suitable in the present invention, the chosen reagent to form the adduct must be one that gives a substituted starch with a pKa of 3 to 8.

Examples of many suitable reagents were tabulated earlier. These reagents can also be used as hydrochloride salts, in forming the adduct with starch.

An example of the preparation of a suitable cationic starch is as follows:

EXAMPLE I

PREPARATION OF MORPHOLINOETHYL STARCH

Corn starch (100 gm) and sodium sulfate (50 gm) is stirred in water (350ml) at room temperature until a uniform slurry is obtained (about 15 minutes). Sodium hydroxide (5 gm) is added slowly with constant stirring. A solution of N-(2-chloroethyl) morpholine hydrochloride (5 gm) in water (50 ml) is then added slowly, and the mixture stirred at room temperature overnight. The reaction mixture is then filter washed with one liter of 50/50 water-ethanol and refiltered. The filter cake is spread out in 2 thin layers and air dried. This product has a D.S. of about 0.04, and a pKa of about 6.2.

EXAMPLE II

Preparation of N,N-bis-isopropyl-2-hydroxy propylamine starch

Corn starch (100 grams) and sodium sulfate (50 grams) are slurried in water (400 ml) at room temperature until a uniform mixture is obtained (about 15 minutes.) A small amount of sodium hydroxide (4 grams) is added slowly with constant and vigorous stirring. To this mixture is added slowly and with constant agitation, N,N bis-isopropyl-2,3-epoxy propylamine (5 grams). The reaction mixture is agitated vigorously overnight at room temperature.

The pH of the mixture is adjusted to pH of about 3 and filtered. The filter cake is reslurried in 90:10 isopropanol water for about thirty minutes and refiltered. This procedure is repeated twice, followed by a wash with methanol and the product air dried. The product has a D.S. of 0.023 and a pKa about 6.9.

EXAMPLE III

Preparation of an Amine Oxide of Diethylaminoethyl starch

Corn starch (100 gm.) and sodium sulfate (50 gm.) are stirred in water (350 ml.) at room temperature, until a uniform slurry is obtained (about 15 minutes). Sodium hydroxide (5 gm.) is then added slowly with constant and vigorous stirring. To this mixture is added, slowly, over a period of about five minutes, a solution of N-(2-chloroethyl) diethylamine hydrochloride (5 gm.) in water (50 ml.). This reaction mixture is allowed to stir overnight at room temperature. After filtration, the filter cake is slurried with one liter of 50/50 water ethanol and refiltered. This procedure is repeated three times. The filter cake is then spread out in a thin layer and air dried. The resulting diethylamino-ethyl starch has a D.S. of about 0.04, and a pKa of about 9.

Diethylaminoethyl starch (70 g.) is slurried in methanol and 35 percent aqueous hydrogen peroxide (5 gm.) added slowly at room temperature. The reaction is heated to 60° C with constant and vigorous stirring and held at this for a period of five hours. The mixture is then filtered, washed three times with methanol, and air dried. The resultant diethylamino-ethyl starch-N-oxide has a pKa of 6.2.

EXAMPLE IV

Preparation of an Amine Oxide of Morpholinoethyl Starch

Morpholinoethyl starch (70 g.) prepared per Ex. 1, is slurried in methanol and 35 percent aqueous hydrogen peroxide (5 gm.) added slowly at room temperature with vigorous stirring. The reaction mixture is heated to 60° c for about four hours, then cooled to room temperature. The slurry is filtered and washed four times with methanol to remove excess hydrogen peroxide. The filter cake is spread into a thin layer and air dried overnight. The resultant morpholinoethyl starch-N-Oxide has a pKa of about 6.2.

EXAMPLE V

Preparation of a Morpholinoethyl Ether of Oxidized Starch

Oxidized starch, Stayco-"S", (48.1 g) is slurried in water (300 ml) to which was added dropwise, 6.5 g of 50 percent aqueous sodium hydroxide. To this slurry is added slowly 6.5 of N-(2-chloroethyl) morpholine hydrochloride. The reaction mixture is stirred overnight at room temperature (25° C).

The reaction mixture is then neutralized to a pH of about 7, and made up to 15 percent active (by addition of D.I. water). The product is not isolated, but is gelatinized directly by heating on a steam bath with constant agitation to give a low viscosity stable dispersion. The resulting starch adduct had a D.S. of about 0.1 and a pKa of about 6.0.

The compounds and compositions can be used in baths in conjunction with other additives such as fabric softeners, wetting agents, optical brighteners, antistatic agents, antioxidants, and bactericides, provided these do not interfere with the attainment of the desired properties. These adjuvants could merely be added in mixture with the cationic starches, or they could be included as reaction products whereby they would be carried onto the fiber by the substantive starch. The reaction would be a salt formation between the cationic group on the starch and one of a. an anionic optical brightener (as in U.S. Pat. No. 3,453,262);

b. an anionic surfactant such as tallow sulfate;

c. an anionic germicide such as a substituted phenolic or an anionic antioxidant (to inhibit oxidation and discoloration of residual fatty soils on the fabric) or formation of a complex between a straight chain alkyl containing compound, such as a surfactant, and the starch adduct.

In addition to utility on fabrics, these cationic starches of pKa 3 to 8 exhibit substantivity and soil release, without causing soil redeposition, on hard surfaces or materials. Application to an automobile surface by exhaustion from a spray rinse; e.g., of a morpholinoethyl adduct of an oxidized starch produces better removal of subsequently picked up road film in an alkaline wash than is observed on car surfaces not so treated.

I claim:

1. A method for treating fabrics to facilitate removal of soil therefrom, comprising:
   a. contacting a fabric with a nitrogen-bearing cationic starch having a pKa value from about 3 to 8 when dissolved in an aqueous solution;
   b. maintaining the pH of said solution between a numerical value ranging from below to about no higher than one whole integer above the pKa of said starch, until same becomes substantive to said fabric;
   c. drying the thus treated starch and exposing it to soiling; and
   d. subsequently washing the treated fabric in a detergent bath at a pH which is initially at a numerical value above that of the pKa of said starch.

2. The method of claim 1 wherein the cationic starch comprises a compound having the general structural formula:

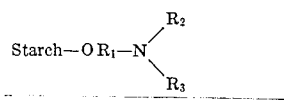

in which $R_1$ is an alkylene or hydroxyalkylene from one to six carbon atoms, alkenylene of two to six carbons; alkyleneoxy of two to four carbon atoms; or polyalkyleneoxy of 2 to 4 carbons per monomer unit, and from 2 to 20 units per $R_1$ substituent;

and $R_2$ and $R_3$ taken individually, are one of:
   a. alkyl straight or branched, hydroxyalkyl straight or branched, thioalkyl straight or branched, alkoxy-alkyl straight or branched, all the foregoing from one to six carbons; or alkenyl of 2 to 6 carbons; or
   b. cycloalkyl from three to six carbons; aryl to ten carbon atoms; arylalkyl from 7 to 10 carbons; or alkyl-aryl to 10 carbons; or
   c. $R_1$ and $R_2$, or $R_2$ and $R_3$, taken collectively with the nitrogen atom, to form a saturated or unsaturated five or six membered heterocyclic ring; and
   d. at least one of the R groups contains either an electron withdrawing group attached to the carbon atom beta to the nitrogen, or a group that sterically hinders protonation of the nitrogen atom.

3. The method of claim 1 wherein the cationic starch comprises a compound having the general structural formula:

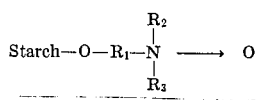

wherein $R_1$ is an alkylene or hydroxyalkylene of one to six carbon atoms; alkenylene of two to six carbons; alkyleneoxy of two to four carbon atoms; or polyalkyleneoxy of 2 to 4 carbons per monomer unit, and from 2 to 20 units per $R_1$ substituent;

and $R_2$ and $R_3$ taken individually, are one of:
   a. alkyl, straight or branched, hydroxyalkyl straight or branched, thioalkyl straight or branched, or alkoxyalkyl, all the foregoing of one to six carbons; or
   b. cycloalkyl from three to six carbons; aryl from six to ten carbons; arylalkyl from seven to ten carbons; or alkylaryl from seven to ten carbons; or
   c. $R_1$ and $R_2$, or $R_2$ and $R_3$, taken collectively, with the nitrogen atom, forms a saturated or unsaturated five or six-membered heterocyclic ring.

4. A method according to claim 1 wherein the starch is morpholinoethyl adduct of oxidized starch.

* * * * *